Jan. 19, 1943.  F. SPINOZZI  2,308,552
MACARONI SPREADER DEVICE
Filed Nov. 10, 1941  3 Sheets-Sheet 3
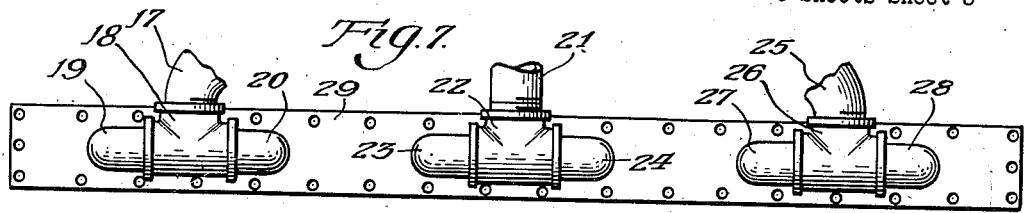
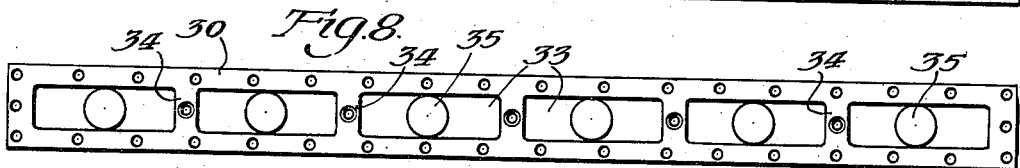
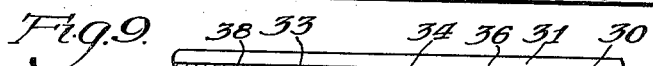
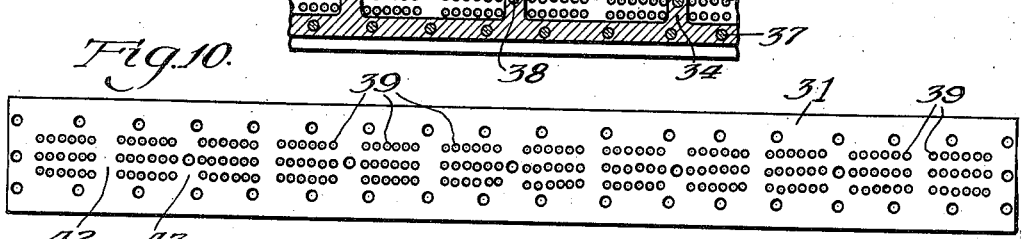
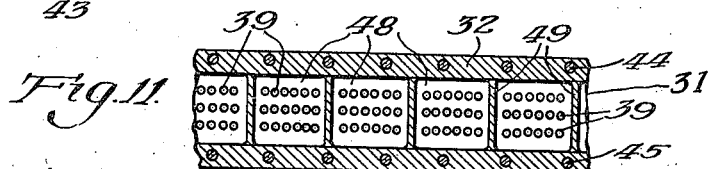
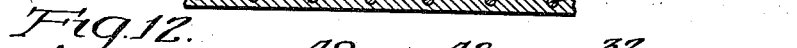
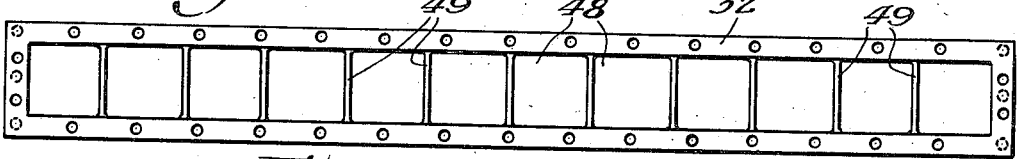
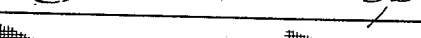
Inventor:
Frank Spinozzi
By: Zabel, Carlson, Gritzbaugh & Wells
Attorneys Patented Jan. 19, 1943

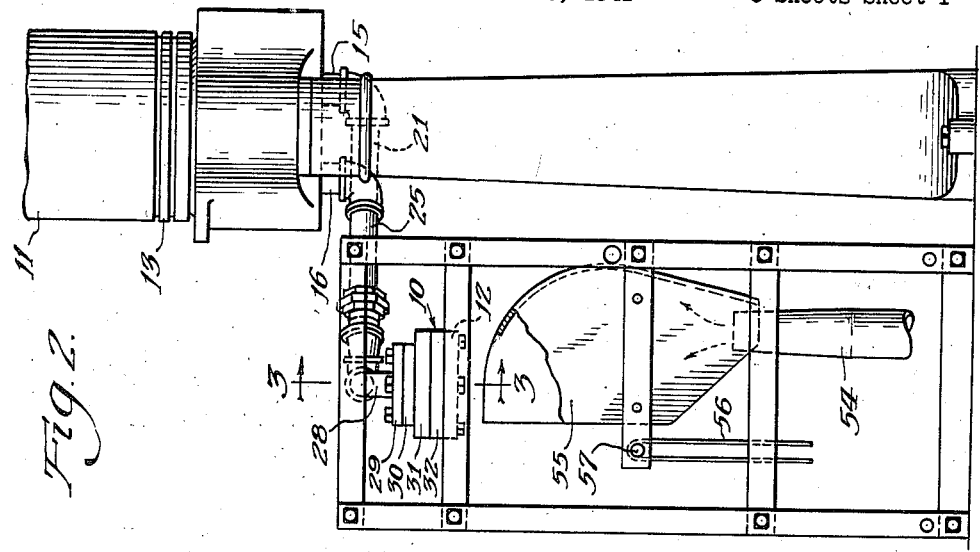
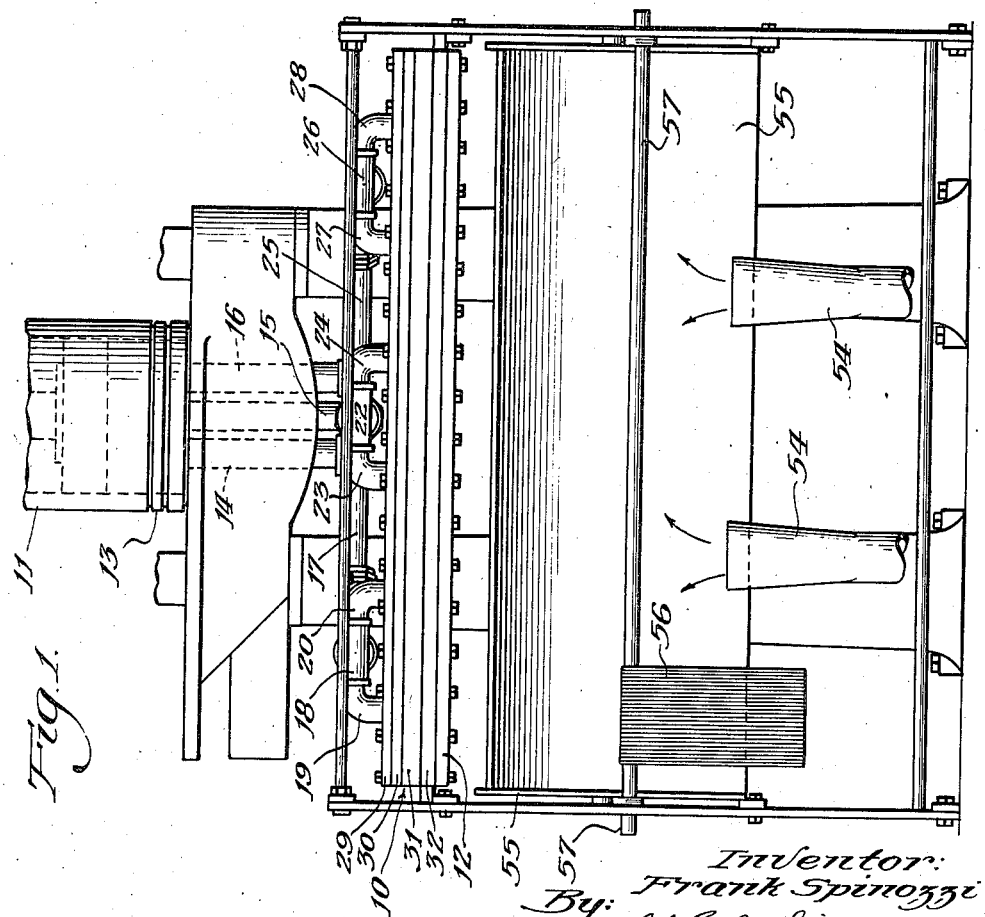

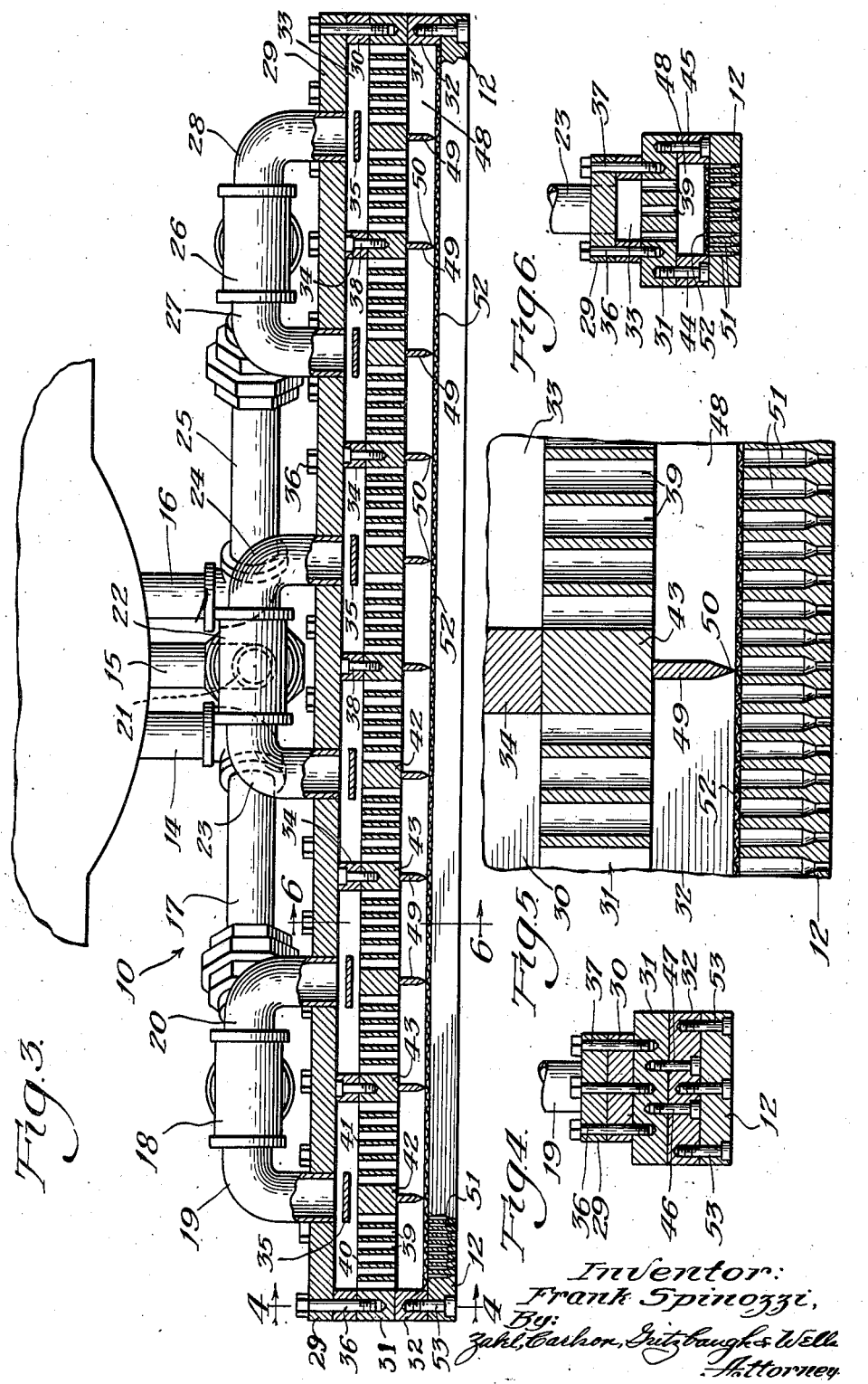

2,308,552

UNITED STATES PATENT OFFICE 2,308,552

MACARONI SPREADER DEVICE

Frank Spinozzi, Steger, Ill., assignor to G. D'Amico Macaroni Company, Steger, Ill., a corporation of Illinois Application November 10, 1941, Serial No. 418,507

15 Claims. (Cl. 107—14)

The present invention relates to the manufacture of dough products such as macaroni, spaghetti and the like. It is the principal purpose of the present invention to provide a spreading and baffling device whereby the dough is fed to the device under pressure in such a manner that the dough will be extruded through a rectangular die with a minimum amount of pressure and waste.

In devices of this character one of the serious problems confronting the industry is the problem of preventing waste due to unequal travel of the dough through different die openings in the die. The present invention contemplates a novel construction whereby dough from the press is divided and extended through separate channels increasing in number from the press cylinder to the final extruding die. The device embodies a novel construction whereby at an intermediate point in its travel through the spreading device the dough is baffled or held back by being caused to flow through a multiplicity of small channels of substantial length. In the final approach to the extruding die the several channels of dough are delivered into separate chambers separated by dividers so that there is a substantially uniform distribution of dough and pressure over each area of die openings exposed to a chamber.

It is also a purpose of the present invention to provide a dough spreading and baffling device wherein the dough is thoroughly kneaded in its travel through the device.

It is also a purpose of the present invention to provide a device of the character described wherein the several parts are readily accessible and are simple in construction.

It is also a purpose of the present invention to provide a device of the character described which may be readily substituted on an existing macaroni press for the die now used thereon.

The purposes and advantages of the invention will appear more clearly from the following description, reference being had to the accompanying drawings wherein a preferred form of the invention is shown. It should be understood however that the drawings and description are illustrative only and should not be taken as limiting the invention except insofar as it is limited by the claims.

In the drawings:

Fig. 1 is a view in front elevation of a press equipped with my invention, there being only a small portion of the press shown since it is a conventional macaroni press;

Fig. 2 is an end view of the construction shown in Fig. 1;

Fig. 3 is an enlarged sectional view taken on the line 3—3 of Fig. 2;

Fig. 4 is a sectional view taken on the line 4—4 of Fig. 3;

Fig. 5 is an enlarged fragmentary sectional view taken on the same line as Fig. 3;

Fig. 6 is a sectional view taken on the line 6—6 of Fig. 3;

Fig. 7 is a plan view of the top plate and pipe connections to the spreader and baffling device;

Fig. 8 is a plan view of the second plate in the spreader device;

Fig. 9 is a fragmentary sectional view taken horizontally through a portion of the plate shown in Fig. 8 with the next lower plate in position beneath the plate shown in Fig. 8;

Fig. 10 is a plan view of the third plate from the top of the spreader device;

Fig. 11 is a sectional view taken horizontally through the fourth plate from the top and looking up at the bottom of the third plate;

Fig. 12 is a plan view of the fourth plate from the top of the spreader device;

Fig. 13 is a plan view of the screen which is interposed between the chambers of the fourth plate and the extruding die plate; and Fig. 14 is a plan view of the extruding die plate.

Referring now in detail to the drawings and particularly to Figs. 1 to 3, inclusive, the present invention is embodied in a spreader device 10 by which dough from a macaroni press cylinder 11 is spread to an extruding die 12. In macaroni presses it is customary to provide an extruding die at the bottom of the press cylinder 11. With my invention this extruding die is replaced by a member 13 which has three outlet openings threaded to receive three outlet pipes 14, 15 and 16. Except for the substitution of the member 13 for the usual die plate of the press no changes are necessary in the basic press construction. My invention is embodied in the spreader device 10 and its connection to the member 13.

Referring now to Figs. 1, 2, 3 and 7, it will be noted that the pipe 14 is connected to a horizontally extending pipe 17 which leads to a T-fitting 18 having two reduced branches 19 and 20 that turn down and enter the spreader device 10. Similarly the pipe 15 is connected by a horizontally extending pipe 21 to a T-fitting 22 having two reduced branches 23 and 24 that extend down into the spreader device 10. A third horizontal pipe 25 connects the outlet pipe 16 to a T-fitting 26 which has two downturned branches 27 and 28 leading to the spreader device 10. It will be noted from an examination of Fig. 3 that the several downturned branches 19, 20, 23, 24, 27 and 28 are uniformly spaced and equal in size.

The spreader device 10 in addition to the extruding die plate 12 is made up of four plates 29, 30, 31 and 32. The top plate 29 serves principally as a cover plate and as a means for receiving the outlets 19—28 hereinbefore described. This top plate 29, for example, is ¾" thick, 4" wide and 50" long. It is drilled and tapped for the outlets 19 and 28 which are 1½" pipe.

The second plate 30 provides a rectangular chamber in communication with each of the outlets 19 to 28. This plate is of the same external dimensions as the plate 29 and is of the same thickness. It is cut away to provide six rectangular chambers 33 which are 2¼" wide and 7" long, the chambers being separated by partitions 34. I have also shown small baffles 35 directly beneath the outlets 19—28 in the several chambers 33. These baffles 35 comprise washers that are welded to the plate 30. The baffles are not however an essential element in the combination and may be dispensed with if desired. I have obtained very good results without them and equivalent results with them.

The plates 29 and 30 are fastened to a third or baffle plate 31 which is substantially thicker than the plates 29 and 30, being 1¼" thick as compared to ¾" thick for each of the plates 29 and 30. The plate 31 is somewhat wider than the plates 29 and 30 and the plates 29 and 30 are fastened thereto by cap screws 36 and 37 which pass through the plates 29 and 30 and are threaded into the plate 31. The plate 30 is also preferably independently fastened to the plate 31 at the partitions 34 by cap screws 38 (see Fig. 3) which are countersunk into the partitions 34 and threaded into the plate 31.

The plate 31 is provided with a multiplicity of small holes 39 about ⅜" in diameter, the holes being arranged in groups of eighteen (see Figs. 9 and 10). There are two groups 40 and 41 of such holes underneath each of the chambers 33, the two groups being separated by an imperforate section 42. It will be noted from an examination of Fig. 6 in particular that the holes 39 are so spaced as to bring the two outside rows of holes very close to the edge of the chamber 33. The plate 31 also has an imperforate section 43 directly beneath each partition wall 34 of the plate 30. The function of the plate 31 is to act as a shredder and kneader for the dough.

The fourth plate 32 is fastened to the plate 31 by a plurality of cap screws 44 and 45 extending along the sides of the two plates and two cap screws 46 and 47 at each end of the plates. All of these screws are countersunk into the plate 32 as shown best in Figs. 4 and 6. The plate 32 provides twelve chambers 48. Each of the chambers is separated from the next adjacent chamber by a divider bar 49 formed integrally with the plate 32 but terminating just short of the bottom face thereof in a tapered sharp edge 50. It will be noted that the dividers 49 are directly beneath the imperforate sections 42 and 43 of the plate 31 and centered with respect to these imperforate sections. The thickness of the plate 32 is about 1". The dividers 49 divide the space within the plate 32 into twelve equal chambers which are roughly 3½" wide, 4" long and 1" deep.

The die plate 12 is provided with the usual die openings 51 (see Figs. 5 and 6). In the actual device shown there are three rows of these openings. The particular construction of the die apertures is shown conventionally here since it forms no part of the present invention. However the actual press shown herein is used in making the special macaroni products known as Fusilli and Yolanda. A screen 52 is interposed over the die openings 51 beneath the dividers 49 so as to prevent blockading of any of the die openings in case there is any foreign matter or hard dough particles in the batch being run through. The extruding die 12 is fastened to the plate 32 around the periphery thereof by a row of cap screws 53, these cap screws being threaded into the plate 32 and countersunk in the plate 12.

The operation of the present device will now be described. A batch of dough is loaded into the press cylinder 11 and placed under pressure so as to cause it to flow through the three outlet pipes 14, 15 and 16 thus effecting the first division of the dough into separate chambers. Each stream of dough, in flowing from the pipes 14, 15 and 16 to the plate 29, is again divided at the T-connections 18, 22 and 26 into two separate streams, making six streams in all. Thus by the time the dough enters the spreader device 10 it has been baffled and divided twice. When the dough enters through the plate 29 there are six streams equally distributed in a distance of 48". Each stream flows into one of the chambers 33 of the plate 30 and spreads out in this chamber. The washers 35 baffle the dough and cause it to flow toward the ends of the chambers. In the case where the washers are not used the stream of dough strikes the imperforate part 42 at the top of the plate 31 and spreads toward the ends of its chamber 33.

The multiplicity of small openings 39, being of substantial length (1¼"), offer substantial resistance to the flow of dough so that the pressure at this point is somewhat evened out. That is to say, if the dough entering a chamber 33 starts to go down one of the openings 39 before it reaches another opening, the resistance to flow through this small opening will retard that dough until the pressure is built up by the dough flowing over the several openings 39. The passage of the dough through the openings 39 breaks it up into a multiplicity of small round streams and gives the dough a good kneading.

The multiplicity of streams of dough coming from the plate 31 is utilized to fill the twelve chambers 48 above the die plate 12. Since the flow into each chamber is quite even these chambers will be practically filled under an even pressure before the dough begins to flow down into the die openings 51. The dividers 49 prevent one section of dough from mixing with another at the entering face of the die 12. I have found that this is necessary in order to avoid waste in trimmings. My past experiments have shown that where two sections of dough meet there is a much faster discharge thus causing more waste in trimmings. With the construction shown substantially uniform pressure is provided in the chambers 48 and these chambers are kept isolated by the dividers 49 about the knife edges 50 blocking the entrance of the dough to the die openings 51.

The screen 52 is of course quite thin and can be placed beneath the edges 50 of the dividers 49 whenever it is desired to use a screen. A screen is not always used but when it is used as shown in the present case it fits over the die 12 without in any way interfering with the assembly of the spreading device.

In the machine shown, and particularly in Figs.

1 and 2, means are provided for directing a blast of air upward through a plurality of nozzles 54 and beneath a hood 55 so as to guide the Fusilli shown at 56 downwardly from the die where it is placed over a drying stick 57. This construction is merely illustrative of one manner in which the material can be removed from the die. The details thereof however are of no importance to the present invention which is embodied in the spreader device 10 and its operation in conjunction with the press cylinder 11.

From the foregoing description it is believed that the construction and operation of the device hereinbefore described will be clear to those skilled in this art. Having thus described my invention, what I claim as new and desire to secure by Letters Patent is:

1. A dough spreader for insertion between the die and the pressure cylinder of a press for making macaroni, spaghetti, and the like, said spreader comprising a body having therein a plurality of separated paths for passage of the dough, each path including a first chamber, a second chamber, a common wall separating said two chambers, said wall being provided with a plurality of small passageways from one to the other, the diameter of each passageway being less than the thickness of the wall, a die plate having a multiplicity of openings through which the dough is discharged in finished form, said die plate forming a wall for all of said second chambers, and inlet means for each of said first chambers communicating with the pressure cylinder.

2. A dough spreader for insertion between the die and the pressure cylinder of a press for making macaroni, spaghetti, and the like, said spreader comprising a body having therein a plurality of separated paths for passage of the dough, each path including a first chamber, a second chamber, a common wall separating said two chambers, said wall being provided with a plurality of small passageways from one to the other, the diameter of each passageway being less than the thickness of the wall, a die plate having a multiplicity of openings through which the dough is discharged in finished form, said die plate forming a wall for all of said second chambers, and inlet means for each of said first chambers communicating with the pressure cylinder, each of said second chambers having a cross-sectional area greater than that of the corresponding first chamber, and said passageways each having a cross-sectional area greater than that of an opening in said die plate.

3. A dough spreader for insertion between the die and the pressure cylinder of a press for making macaroni, spaghetti, and the like, said spreader comprising a body having therein a plurality of separated paths for passage of the dough, each path including a first chamber, a second chamber, a common wall separating said two chambers, said wall being provided with a plurality of small passageways from one to the other, the diameter of each passageway being less than the thickness of the wall, a die plate having a multiplicity of openings through which the dough is discharged in finished form, said die plate forming a wall for all of said second chambers, and inlet means for each of said first chambers communicating with the pressure cylinder, each of said second chambers having a cross-sectional area greater than that of the corresponding first chamber, there being twice as many of the second chambers as there are first chambers.

4. A press for macaroni, spaghetti, and the like comprising a pressure cylinder, a plurality of conduits extending therefrom, each conduit branching into a plurality of sub-conduits, and means for further subdividing and equalizing the flow of dough until the product is formed, said means comprising alternate pressure equalizing chambers and apertured plates, the last apertured plate comprising a die plate.

5. A dough spreader for insertion between the pressure cylinder and the extruding die of a press for macaroni, spaghetti, and the like, said spreader comprising means to divide and to subdivide the dough from the cylinder into a plurality of streams and spreading and baffling means in communication therewith and in communication with said die for further subdividing and for kneading the dough in each of said streams, said latter means comprising two series of chambers in communication with each other, and means providing a multiplicity of like flow equalizing passages from each chamber of the first series to the corresponding chambers of the second series.

6. A dough spreader for insertion between the pressure cylinder and the extruding die of a press for macaroni, spaghetti, and the like, said spreader comprising means to divide and to subdivide the dough from the cylinder into a plurality of streams and spreading and baffling means in communication therewith and in communication with said die for further subdividing and for kneading the dough in each of said streams, said latter means comprising two series of chambers in communication with each other, and means providing a multiplicity of like flow equalizing passages from each chamber of the first series to the corresponding chambers of the second series, there being two chambers in the second series for each chamber in the first series.

7. A dough spreader for insertion between the pressure cylinder and the extruding die of a press for macaroni, spaghetti, and the like, said spreader comprising means to divide and to subdivide the dough from the cylinder into a plurality of streams and spreading and baffling means in communication therewith and in communication with said die for further subdividing and for kneading the dough in each of said streams, said latter means comprising two series of chambers in communication with each other, and means providing a multiplicity of like flow equalizing passages from each chamber of the first series to the corresponding chambers of the second series, the spreader having tapered partitions between the chambers in the second series, said second series of chambers opening directly upon the die and the partitions terminating in thin edges slightly spaced from the die surface.

8. A press for macaroni, spaghetti, and the like comprising a pressure cylinder and a rectilinear extruding die, communicating means extending therebetween, said means including a series of passageways which serve to divide the dough into a plurality of separate streams, and to further subdivide each of said streams, and terminating in a plurality of contiguous chambers of which said extruding die forms a common wall, the side walls which separate each of said chambers being shaped to a knife edge at their point of contact with said extruding die so as to permit the dough to be applied to the whole area of said extruding die with a substantially uniform pressure.

9. A press for macaroni, spaghetti, and the like, comprising a pressure cylinder and a rectilinear extruding die, communicating means extending therebetween, said means including a series of passageways which serve to divide the dough into a plurality of separate streams, and to further subdivide each of said streams, and terminating in a plurality of contiguous chambers of which said extruding die forms a common wall, the inlets for the streams to said contiguous chambers comprising a multiplicity of relatively small and elongated passageways for each stream.

10. A dough spreader comprising two series of plates, one series being provided with large size apertures and the other with small size apertures, the plates of the one series being alternately disposed with respect to the plates of the other series and all the plates being secured together with their apertures in communication with each other, whereby the large apertures in one series of plates provide collection chambers and the small apertures in the other series of plates provide kneading and forming means for the dough.

11. In a press, a dough spreader comprising two series of plates, one series being provided with large size apertures and the other with small size apertures, plates of one series being alternately disposed with respect to the plates of the other series, and all the plates being secured together with their apertures in communication with each other, the plates of said first series being arranged so that the total cross-sectional area of all their apertures therein increase in one direction (so that the number of apertures therein increase in one direction) and the plates of the second series being arranged so that the first of the apertures of each plate increase in the other direction (so that the number of apertures increase in the same direction), the first and the last plate of the assembly being of said second series, and said last plate constituting a die plate, a pressure cylinder, and communicating means between said pressure cylinder and the apertures of said first plate, said communicating means comprising a plurality of conduits each of which is subdivided into branch conduits which lead to said apertures of said first plate.

12. A device for spreading and delivering dough from the pressure cylinder of a press for making macaroni, spaghetti and the like to an extruding die, said device comprising means for dividing and subdividing the flow of dough into a plurality of separate streams and means for equalizing the pressure in each stream comprising relatively large chambers into which the streams are directed, outlet means for said chambers comprising a plurality of passageways of reduced diameter, and other large chambers opening directly to the die into which the streams from said passageways discharge.

13. A device for spreading and delivering dough from the pressure cylinder of a press for making macaroni, spaghetti and the like to an extruding die, said device comprising means dividing and subdividing the flow of dough into a plurality of separate streams and means in the several streams for equalizing the pressure therein comprising relatively large chambers, each having one wall thereof provided with a plurality of passageways of reduced diameter but substantially larger than the die openings, and means collecting the streams of dough discharged through the passageways from the chambers comprising chambers that open upon said extruding die.

14. A device for spreading dough under pressure to a rectilinear extruding die, said device comprising a series of chambers arranged in a row with means for supplying the individual chambers with the dough under pressure, outlet means individual to said chambers comprising a series of passageways in one wall of each chamber, a second series of chambers into which said passageways open, said second chambers opening directly on the extruding die whereby each chamber individually supplies a section of the extruding die.

15. A press for macaroni, spaghetti and the like comprising a pressure chamber, an elongated extruding die, and communicating means extending therebetween adapted to transfer the dough under pressure from the pressure chamber to the extruding die so as to present the dough to the extruding die under a substantially uniform pressure, said means comprising a series of passageways which serve to divide the dough into a plurality of separate streams, and to further subdivide each of said streams, and terminating in a plurality of contiguous but separate chambers of which said extruding die forms a common wall.

FRANK SPINOZZI.